(12) United States Patent
Haenger et al.

(10) Patent No.: US 11,245,549 B2
(45) Date of Patent: Feb. 8, 2022

(54) BUS SYSTEM, SUBSCRIBER STATION THEREFOR, AND METHOD FOR CONFIGURING A STATIC BUS SYSTEM FOR A DYNAMIC COMMUNICATION

(71) Applicant: Robert Bosch GmbH, Stuttgart (DE)

(72) Inventors: Jochen Ulrich Haenger, Neckarwestheim (DE); Markus Schweizer, Vaihingen/Enz (DE); Rakshith Amarnath, Hemmingen (DE); Robert Szerwinski, Stuttgart (DE); Thomas Heinz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/745,462

(22) PCT Filed: Jun. 2, 2016

(86) PCT No.: PCT/EP2016/062469
§ 371 (c)(1),
(2) Date: Jan. 17, 2018

(87) PCT Pub. No.: WO2017/012762
PCT Pub. Date: Jan. 26, 2017

(65) Prior Publication Data
US 2018/0212797 A1   Jul. 26, 2018

(30) Foreign Application Priority Data
Jul. 17, 2015   (DE) .......................... 102015213522.5

(51) Int. Cl.
*H04L 12/40* (2006.01)
(52) U.S. Cl.
CPC ............... *H04L 12/40169* (2013.01); *H04L 2012/40215* (2013.01); *H04L 2012/40241* (2013.01); *H04L 2012/40273* (2013.01)

(58) Field of Classification Search
None
See application file for complete search history.

(56) References Cited

U.S. PATENT DOCUMENTS

| 7,526,579 | B2* | 4/2009 | Wray | .................... G06F 13/385 710/11 |
| 7,680,967 | B2* | 3/2010 | Broome | ............... G06F 13/385 710/62 |

(Continued)

FOREIGN PATENT DOCUMENTS

| CN | 103269297 A | 8/2013 |
| CN | 103403771 A | 11/2013 |

(Continued)

OTHER PUBLICATIONS

Scott Monroe et al.: "Solution of CAN and CAN FD in a mixed network topology", Nov. 13, 2013 (Nov. 13, 2013), XP055218947.

(Continued)

*Primary Examiner* — Gregory B Sefcheck
*Assistant Examiner* — Suk Jin Kang
(74) *Attorney, Agent, or Firm* — Norton Rose Fulbright US LLP; Gerard A. Messina

(57) ABSTRACT

A bus system, a subscriber station, and a method for configuring a static bus system for a dynamic communication are provided. The bus system has at least two subscriber stations, a communications link for connecting the subscriber stations to each other, and at least one device for the dynamic communication between the subscriber stations of the bus system; the subscriber stations and the communications link are developed for the static communication, which is directed to messages to be transmitted on the bus system that are known when the bus system is made available and are configured according to specified transmitters and receivers, and the dynamic communication is directed to messages to be transmitted on the bus system that have (Continued)

become known only after the subscriber stations and the communications link have been made available and are configured according to specified transmitters and receivers.

20 Claims, 3 Drawing Sheets

(56) References Cited

U.S. PATENT DOCUMENTS

| | | | |
|---|---|---|---|
| 2001/0047470 A1* | 11/2001 | Roche | G06F 9/4818 712/244 |
| 2003/0135622 A1* | 7/2003 | Anderson | H04L 12/40169 709/227 |
| 2006/0171410 A1* | 8/2006 | Jung | H04L 12/40143 370/447 |
| 2010/0148940 A1* | 6/2010 | Gelvin | H04L 67/12 340/286.02 |
| 2010/0215043 A1* | 8/2010 | Hisada | H04L 12/40 370/392 |
| 2010/0260102 A1* | 10/2010 | Liu | H04L 1/1848 370/328 |
| 2011/0029644 A1* | 2/2011 | Gelvin | H01Q 9/0464 709/220 |
| 2011/0035491 A1* | 2/2011 | Gelvin | G06F 15/173 709/224 |
| 2012/0054406 A1* | 3/2012 | Watroba | H04L 12/40039 710/316 |
| 2012/0201126 A1* | 8/2012 | Knapp | H04L 12/43 370/222 |
| 2013/0179702 A1* | 7/2013 | Asano | H04L 12/40013 713/300 |
| 2013/0294460 A1* | 11/2013 | Hell | H04L 25/0272 370/470 |
| 2013/0294540 A1* | 11/2013 | Hell | H04L 12/40013 375/295 |
| 2014/0047282 A1* | 2/2014 | Deb | G06F 11/0751 714/48 |
| 2014/0071995 A1* | 3/2014 | Hartwich | H04L 1/0002 370/468 |
| 2014/0129748 A1* | 5/2014 | Muth | G06F 13/4072 710/106 |
| 2014/0325106 A1* | 10/2014 | Guertner | H04L 12/4035 710/124 |
| 2014/0365693 A1* | 12/2014 | Monroe | G06F 13/385 710/105 |
| 2015/0003443 A1* | 1/2015 | Koenigseder | H04W 40/20 370/350 |
| 2015/0010017 A1* | 1/2015 | Kraly | H04L 12/40032 370/468 |
| 2015/0046582 A1* | 2/2015 | Gelvin | H04L 67/12 709/224 |
| 2015/0055473 A1* | 2/2015 | Moriya | H04L 12/40006 370/235 |
| 2015/0063109 A1* | 3/2015 | Han | H04L 47/16 370/235 |
| 2015/0095532 A1* | 4/2015 | Muth | G06F 13/4072 710/105 |
| 2015/0095711 A1* | 4/2015 | Elend | G06F 11/221 714/39 |
| 2015/0154113 A1* | 6/2015 | Krieger | G06F 8/654 711/103 |
| 2015/0220412 A1* | 8/2015 | Mabuchi | H04L 12/4135 710/19 |
| 2015/0312052 A1* | 10/2015 | Horst | H04L 61/2038 710/106 |
| 2015/0347218 A1* | 12/2015 | Domingues | G06F 11/0772 714/57 |
| 2015/0373158 A1* | 12/2015 | Kim | H04L 69/08 709/223 |
| 2016/0080168 A1* | 3/2016 | Lieder | H04L 12/40032 370/468 |
| 2016/0212162 A1* | 7/2016 | Cain | H04L 63/08 |
| 2016/0241418 A1* | 8/2016 | Kang | H04L 12/4013 |
| 2016/0286010 A1* | 9/2016 | Lennartsson | H04L 69/08 |
| 2016/0308891 A1* | 10/2016 | Cain | H04L 12/40 |
| 2016/0311387 A1* | 10/2016 | Van Buskirk | B60R 21/01 |
| 2016/0344552 A1* | 11/2016 | Sharma | H04L 9/3242 |
| 2016/0344703 A1* | 11/2016 | Sharma | H04L 63/0428 |
| 2017/0123479 A1* | 5/2017 | Asano | H04L 12/40013 |
| 2018/0018011 A1* | 1/2018 | Asano | G06F 1/26 |
| 2018/0331852 A1* | 11/2018 | Kraly | H04L 12/40032 |
| 2019/0124091 A1* | 4/2019 | Ujiie | B60R 16/023 |

FOREIGN PATENT DOCUMENTS

| | | |
|---|---|---|
| EP | 2800316 A1 | 11/2014 |
| EP | 2822227 A1 | 1/2015 |
| JP | 2006261730 A | 9/2006 |
| JP | 2006273261 A | 10/2006 |
| JP | 2008113339 A | 5/2008 |
| JP | 2009253803 A | 10/2009 |
| JP | 2010215008 A | 9/2010 |
| JP | 2014204287 A | 10/2014 |

OTHER PUBLICATIONS

International Search Report dated Aug. 12, 2016, of the corresponding International Application PCT/EP2016/062469 filed Jun. 2, 2016.

* cited by examiner

BUS SYSTEM, SUBSCRIBER STATION THEREFOR, AND METHOD FOR CONFIGURING A STATIC BUS SYSTEM FOR A DYNAMIC COMMUNICATION

CROSS-REFERENCE TO RELATED APPLICATIONS

The present application is the national stage of International Pat. App. No. PCT/EP2016/062469 filed Jun. 2, 2016, and claims priority under 35 U.S.C. § 119 to DE 10 2015 213 522.5, filed in the Federal Republic of Germany on Jul. 17, 2015.

BACKGROUND INFORMATION

In vehicles such as motor vehicles, trucks, and others, information must be exchanged between different control units, for instance for a brake-assistance system, a windshield washer system, an air-conditioning system etc., either among one another and/or with sensors. This exchange takes place in the form of data and with the aid of communications systems, which are also referred to as automotive communications systems in the context of vehicles.

Automotive communications systems are currently constructed with the aid of different bus systems, in which the data are transmitted packaged in messages or frames. Among others, CAN, CAN-FD, FlexRay and, in the future, automotive Ethernet are used as bus systems. A bus system is made up of the communications software in a control unit or sensor or a display unit or an actuator or any other unit that is connected to the bus system and exchanges information therewith, as a subscriber station of the bus system; it is also made up of the communications hardware in the control unit, the sensor, the display unit or the actuator or any other unit that is connected to the bus system and exchanges information therewith, etc., as a subscriber station of the bus system, and the data lines for connecting the subscriber stations with one another.

The bus systems are currently characterized by the fact that the transmittable information is known at the time when a new vehicle comes onto the market. This knowledge relates to the transmitters of the information, the receivers of the information, and the representation of the information on the bus system. The data that describe the information to be conveyed or transmitted are also referred to as the configuration. The configuration is part of the communications software of the bus system.

Since the information to be transmitted is known at the time when a new vehicle arrives on the market, the communications software in the subscriber stations of the bus system has a static design. In other words, the communications software can process only information that was known at the time when the new vehicle was introduced into the market.

In addition, the identification of the information on the data lines is also statically allocated. Depending on the bus system, the identifiers of a message transmitted via the bus, which are also referred to as frame identifiers, cycle counters or port addresses, are used for this identification.

After a new vehicle has been introduced into the market, the configuration of the communication is currently able to be modified only by a software update, by selecting another configuration already available on the subscriber station of the bus system, and/or, to a slight degree, by modifying the frame identifiers of information packets, which are statically available. Such a static configuration of the communication is a serious disadvantage within the context of the communication requirements that are subject to ever-greater dynamic changes.

Therefore, there is a need for a dynamic communication in an effort to reduce the large investment required for communicating information that is not known at the time when a new vehicle is brought into the market, using the existing static bus systems.

SUMMARY

It is an object of the present invention to provide a bus system, a subscriber station therefor, and a method for configuring a static bus system for a dynamic communication, said bus system, subscriber station and method solving the aforementioned problems. In particular, a bus system, a subscriber station, and a method are provided that allow for a dynamic communication within a bus system at a low investment and without losing any communications features of the bus system.

In accordance with the present invention, the bus system includes at least two subscriber stations, a communications link for connecting the at least two subscriber stations to each other, and at least one device for the dynamic communication between the at least two subscriber stations of the bus system. The at least two subscriber stations and the communications link are developed for a static communication, which is directed to messages to be transmitted through the bus system that are known when the bus system is made available and are configured according to specified transmitters and receivers. The dynamic communication is directed to messages to be transmitted through the bus system that have become known only after the at least two subscriber stations and the communications link have been made available and are configured according to specified transmitters and receivers.

The bus system allows for a dynamic communication while permitting the continued use of the previously used static communications software. No changes in the configuration of the communications software are required. Nevertheless, it is possible to communicate virtually any information on the bus system. In this way, the current features of bus systems for modifying the communication after a vehicle has been introduced on the market are greatly expanded.

The bus system simplifies and accelerates the introduction of a dynamic communication as it is required for the networking of a vehicle with the Internet, the upcoming Car2X communication and the introduction of user software programs, also referred to as apps in abbreviated form, for various subscriber stations of the bus system, e.g., control units. As a result, virtually any information is able to be communicated on the bus system even if the information is not known during the initial operation of the bus system, for instance when a new vehicle is introduced into the market, a bus system is taken into operation in a move to a newly completed building, etc.

In addition, the bus system allows for the preferable use of communications resources featuring high priority over communications resources featuring a lower priority. This results in an optimal utilization of the bus bandwidth, e.g., in a FlexRay bus system, and in an optimal real-time behavior.

Advantageous further refinements of the bus system are described herein.

It is also possible that a transmission of the messages on the bus system is carried out in a dual priority-oriented manner, in which both the priority of the message and the priority of the allocated communications resource are taken into account.

It is possible that each of the at least two subscriber stations for the static communication have a communications hardware and a communications software for a transmission of the messages via the communications link. The communications hardware, the communications software, and the communications link are devices for the static communication. The devices for the static communication may include the at least one device for the dynamic communication.

In special developments of the present invention, making the bus system available refers to the delivery of a product that includes the bus system, and/or the bus system is the bus system of a vehicle and/or the bus system is a serial bus system.

According to one exemplary embodiment, the messages of the dynamic communication may include at least a portion of the payload data of the dynamic communication as the identifier in the payload data of the messages and/or in a predefined number of low-priority bits of the identifier, which is provided for the message of the dynamic communication.

According to such an exemplary embodiment, the bus system may be a CAN or a CAN FD bus system, and the at least one device for the dynamic communication may be designed to use at least one previously reserved identifier of the CAN or the CAN FD bus systems. Each previously reserved identifier is allocated to maximally one subscriber station for the transmission of a message, and all subscriber stations are developed to receive the previously reserved identifiers.

According to one further exemplary embodiment, the bus system may be a FlexRay bus system, and the at least one device for the dynamic communication is designed to use at least one previously reserved time window of the FlexRay bus system. Each previously reserved time window is allocated to maximally one subscriber station for the transmission of a message, and all subscriber stations are developed to receive the content of the previously reserved time windows.

A subscriber station in accordance with the present invention includes a communications-control unit for generating or reading a message for or from one further subscriber station of the bus system, a transceiver device for transmitting a message generated by the communications-control unit and/or for receiving a message from a further subscriber station of the bus system via a communications link of the bus system, and a device for the dynamic communication between the subscriber station and the further subscriber station. The communications-control unit and the transceiver device are developed for the static communication, which is directed to the messages to be transmitted on the bus system that are known when the subscriber station is made available, and the dynamic communication is directed to messages to be transmitted on the bus system that are not known when the subscriber station is made available.

A method for configuring a static bus system having at least two subscriber stations that are connected to a communications link of the bus system, for a dynamic communication is provided in accordance with the present invention. In the method, the at least two subscriber stations and the communications link are developed for the static communication, which is directed to messages to be transmitted on the bus system that are known when the bus system is made available and are configured according to specified transmitters and receivers. The dynamic communication is directed to messages to be transmitted on the bus system that are known only after the at least two subscriber stations and the communications link have been made available and are configured according to specified transmitters and receivers. The method includes the step of providing at least one device for the bus system that is developed for the dynamic communication between the at least two subscriber stations of the bus system.

Additional possible implementations of the present invention also include not explicitly mentioned combinations of features or specific embodiments described previously with regard to the exemplary embodiments and described in the following text. One skilled in the art will also add individual aspects as improvements or supplementations to the respective basic form of the present invention.

BRIEF DESCRIPTION OF THE DRAWINGS

Below, the present invention is described in greater detail on the basis of exemplary embodiments with reference to the figures.

Identical or functionally equivalent elements have been provided with the same reference numerals in the figures, unless otherwise noted.

DETAILED DESCRIPTION OF EXAMPLE EMBODIMENTS

Figure 1:
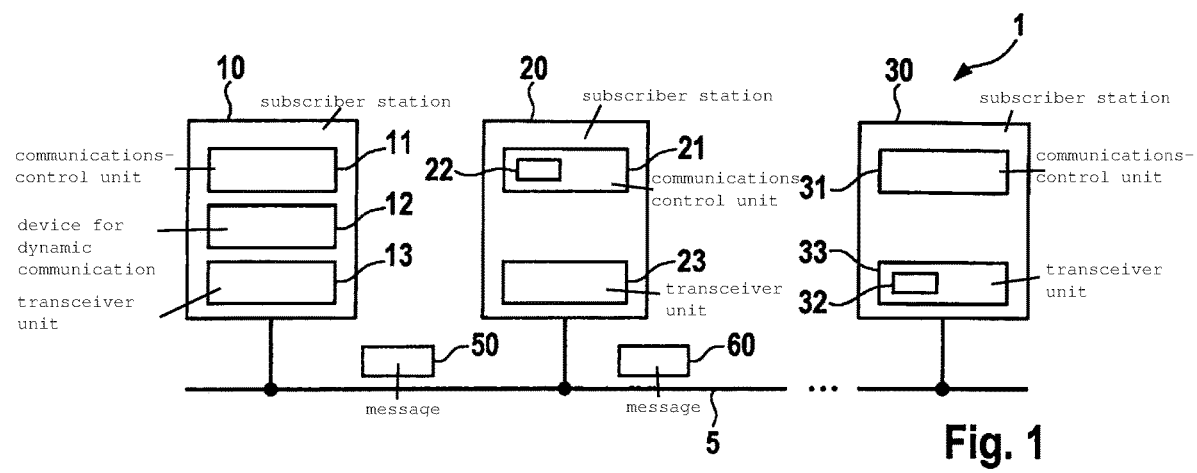
FIG. 1 shows a simplified block diagram of a bus system according to a first exemplary embodiment.

In a first exemplary embodiment, FIG. 1 shows a bus system 1, which may be a CAN FD bus system, for instance. Bus system 1 may be used in a vehicle, in particular a motor vehicle, an airplane, etc., or in the industrial field such as in control systems etc., or in a hospital, and others.

In FIG. 1, bus system 1 has a communications link 5, which connects a multitude of subscriber stations 10, 20, 30. Frames or messages 50, 60 are able to be transmitted between individual subscriber stations 10, 20, 30 via communications link 5. For example, communications link 5 may be developed as a wire-conducted bus line or as a wireless connection. Subscriber stations 10, 20, 30 could be control units, sensors, display devices, etc. of a motor vehicle, for instance. Messages 50 are what are called static messages, and messages 60 are so-called dynamic messages.

Static messages 50 reflect the information that is known at the time when bus system 1 is brought into the market, e.g., in a new vehicle, building, etc. Such knowledge relates to the transmitters of the information and the representation of the information on bus system 1 and mostly to the receivers of the information. The data that describe the information to be conveyed or transmitted with the aid of messages 50 are also referred to as configuration. The configuration is part of the static communications software of bus system 1, in which it is precisely specified which messages 50 are generated by which particular transmitters. In contrast thereto, dynamic messages 60 reflect all the information that becomes known after bus system 1 has been brought into the market, such as in a new vehicle, building, etc.

Quite generally, the static communication on bus system 1 is provided on the basis of a configuration of bus system 1 that was set up prior to the first operation of bus system 1, and the dynamic communication is provided on the basis of a configuration of bus system 1 that was set up after the first use of bus system 1.

As shown in FIG. 1, subscriber station 10 has a communications-control unit 11, a device 12 for the dynamic communication, and a transceiver unit 13. In contrast, subscriber station 20 has a communications-control unit 21 which includes a device 22 for the dynamic communication, and a transceiver device 23. Subscriber station 30 has a communications-control unit 31 and a transceiver device 33, which includes a device 32 for the dynamic communication. Transceiver devices 13, 23, 33 of subscriber stations 10, 20, 30 are directly connected to communications link 5 in each case, even if this is not shown in FIG. 1.

Communications-control units 11, 21, 31 control a communication of respective subscriber station 10, 20, 30 by way of communications link 5 with a further subscriber station of the subscriber stations 10, 20, 30 connected to communications link 5. Communications-control units 11, 21, 31 may be developed like a conventional CAN or CAN FD controller with regard to the static communication. Communications-control units 11, 21, 31 may also be developed as a part of a microcontroller in each case, which is also included by respective subscriber station 10, 20, 30.

Transceiver devices 13, 23, 33 transmit or receive messages 50, 60 generated or to be read by the respectively allocated communications-control unit 11, 21, 31. Transceiver devices 13, 23, 33 may be developed in the manner of a conventional CAN or CAN FD transceiver in each case.

Devices 12, 22, 33 for the dynamic communication are also able to be developed in the form of software modules, which form part of the software running on associated subscriber station 10, 20, 30 for the dynamic communication on bus system 1.

Figure 2:
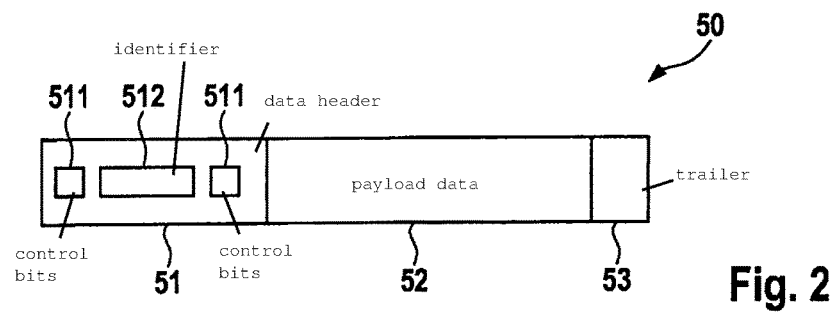
FIG. 2 shows a representation of a structure of a frame in the bus system according to the first exemplary embodiment.

FIG. 2 shows the structure of a static message 50. Static message 50 is structured like a conventional CAN or CAN FD message. Static message 50 has a data header 51, payload data 52, and a trailer 53. In addition to control bits 511, data header 51 includes an identifier 512, which allows message 50 to be clearly allocated to subscriber station 10, 20, 30 that has generated message 50. Trailer 53 identifies the end of message 50.

Payload data 2 include the information that is to be transmitted by one of subscriber stations 10, 20, 30 to another subscriber station 10, 20, 30 by way of communications link 5. Payload data 52 have content or information that is known when bus system 1 is made available, as described in the previous text. For example, payload data 52 may be measured values that a sensor as a subscriber station 30 transmits to a brake-control unit as subscriber station 20. In this instance, it is already known when bus system 1 is made available that the sensor as subscriber station 30 will transmit such measured values to the brake-control unit as subscriber station 20 during a standard operation.

In addition, communications-control units 11, 21, 31 and transceiver devices 13, 23, 33 are developed in such a way that they are all able to exchange messages 50 that are generated for allocated subscriber station 10, 20, 30 by other subscriber stations 10, 20, 30 and which are generated for another subscriber station 10, 20, 30.

Figure 3:
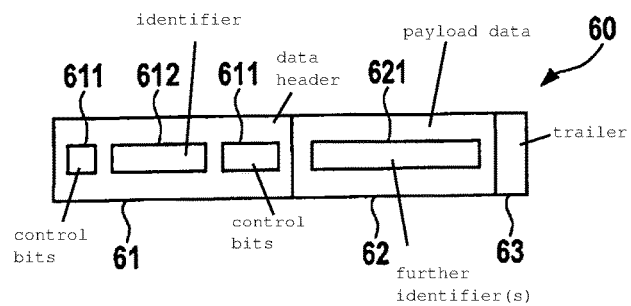
FIG. 3-6 show the format of CAN FD frames with the placement of the first four identifier bits (ID28-ID25) to be checked, and check bit RRS, with reference to a second exemplary embodiment in each case.

FIG. 3 illustrates the structure of a dynamic message 60. Dynamic message 60 is basically structured like a conventional CAN or CAN FD message. As a result, dynamic message 60 also has a data header 61, payload data 62, and a trailer 63. In addition to control bits 611, data header 61 includes an identifier 612, which allows for a clear allocation of message 60 to subscriber station 10, 20, 30 that has generated message 60. Trailer 63 identifies the end of dynamic message 60.

Payload data 62 include as further identifiers or information identifier 621 the information that is to be transmitted by one of subscriber stations 10, 20, 30 to a further subscriber station 10, 20, 30 by way of communications link 5. Payload data 62 in dynamic message 60 have content or information that is not known when bus system 1 is made available. For example, payload data 62 could be measured values, which a sensor, added to the bus system at a later point in time, as subscriber station 30 transmits to a display device as subscriber station 10 and/or to a brake-control unit as subscriber station 20. In this instance, it is therefore not yet known when bus system 1 is made available that the sensor as subscriber station 30 will transmit such measured values to the display device as subscriber station 10 and/or to a brake-control unit as subscriber station 20 during a normal operation.

Each reserved identifier 612 is allocated to maximally one subscriber station of subscriber stations 10, 20, 30, which is able to use this reserved identifier for a transmission.

Reserved identifiers 612 for the dynamic communication are able to be received by all transceiver devices 13, 23, 33 or all subscriber stations 10, 20, 30 and may be used by devices 12, 22, 32 for the dynamic communication.

The content of the dynamic communication, i.e. the information or dynamic payload data 62 to be transmitted between at least two of subscriber stations 10, 20, 30, is thus identified by information identifiers 621, which are part of payload data 62 of a dynamic message 60. The identification of the dynamic communications content, i.e. payload data 62, and the identification of the communications resources statically made available, via identifier 612, are thus independent of each other.

A service-oriented protocol such as SOME/IP, or a derivation thereof may be used for the identification of the information in payload data 62 that is identified via identifier 621. The service-oriented protocol is able to be executed by respective device 12, 22, 32 for the dynamic communication upon receipt of a message 60.

In this particular exemplary embodiment, devices 12, 22, 32 for the dynamic communication are thus designed to use identifiers 612, 621 as communications resources that are reserved for the dynamic communication. At the time of the reservation, it is not known for which information these communications resources will be used at a later date. Devices 12, 22, 32 for the dynamic communication may be developed as an application program (app), which is later loaded onto the corresponding subscriber station 10, 20, 30 in order to generate and/or read messages 60.

Figure 4:
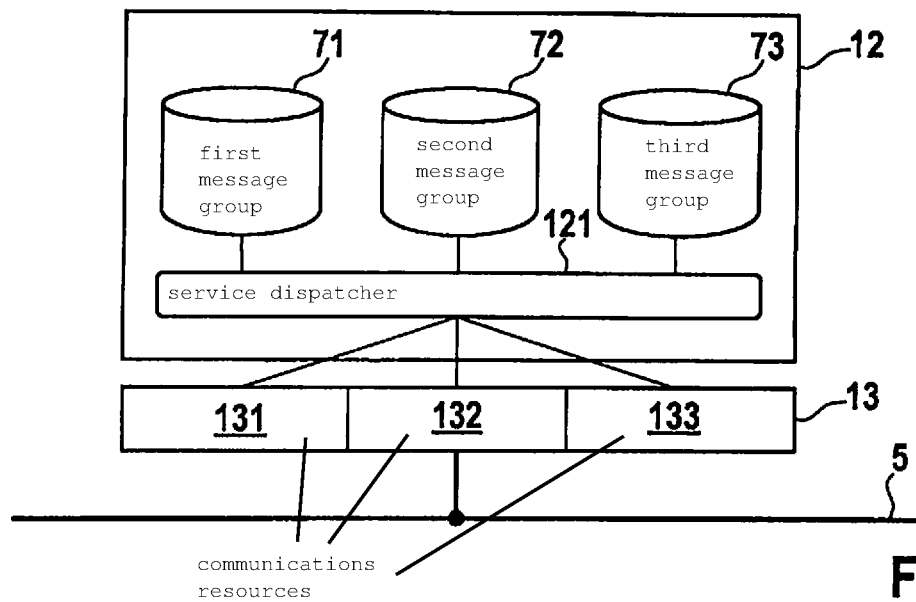

As illustrated in FIG. 4, it is also advantageous if device 12 for the dynamic communication includes a service dispatcher 121, which groups messages 50, 60 to be transmitted according to the priority of messages 60 to be transmitted. Devices 22, 32 for the dynamic communication are structured in the same way as device 12 for the dynamic communication.

For example, three groups exist, which have different priorities with regard to the information to be transmitted. In FIG. 4, a first message group 71 has the highest priority, a second message group 72 has an average priority, and a third message group 73 has the lowest priority. Any number of such priority-based groups 71, 72, 73 may exist.

Alternatively or additionally, service dispatcher 121 may consider static communications resources 131, 132, 133 allocated for the dynamic communication also according to their priority. To do so, for example, three communications resources 131, 132, 133 may likewise be available, in which case communications resource 131 has the highest priority, communications resource 132 has the average priority, and communications resource 133 has the lowest priority. When a communications resource 131, 132, 133 is allocated a message 60 to be transmitted, communications resource 131, 132, 133 for the transmission of message 60 is occupied until this message 60 has been successfully transmitted onto communications link 5. Communications resource 131, 132, 133 will then be available again.

As a result, service dispatcher 121 may operate in a priority-based manner either in a single or twofold manner. Accordingly, service dispatcher 121 is able to transmit messages 60 according to their allocation to the first through the third message groups 71, 72, 73. Service dispatcher 121 then transmits messages 60 having a low priority only when no message 60 having a higher priority is ready to be transmitted. Alternatively or additionally, service dispatcher 121 may always use communications resource 131, 132, 133 that is available and has the highest priority. If service dispatcher 121 is meant to operate only in a simple priority-oriented manner, then service dispatcher 121 may be appropriately developed only for the desired priority orientation.

Figure 5:
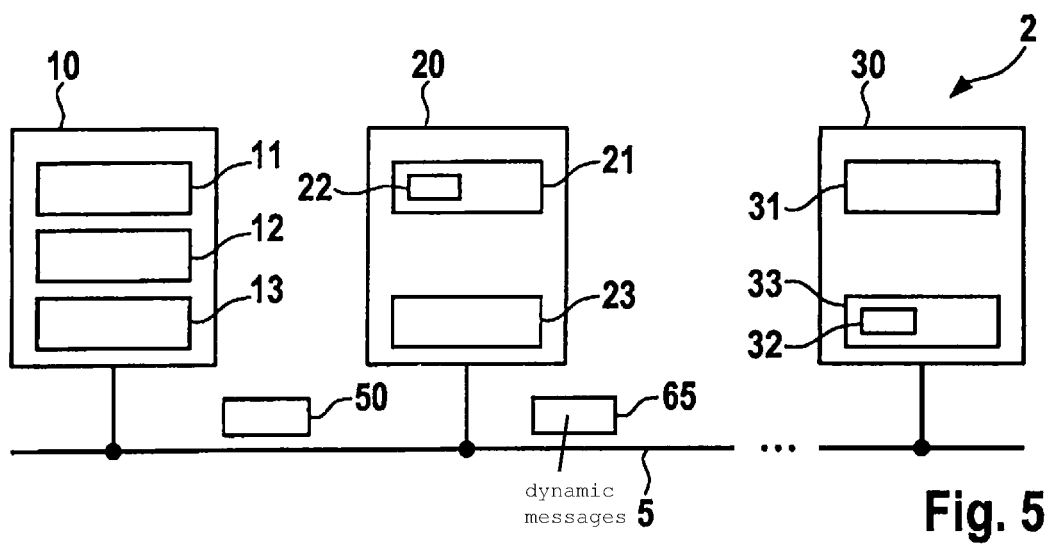

FIG. 5 shows a bus system 2 according to a second exemplary embodiment, in which messages 65 are transmitted during the dynamic communication. In all other respects, bus system 2 in this particular exemplary embodiment is structured in the same manner as described with reference to the preceding exemplary embodiment. As a result, only the differences of bus system 2 in comparison with bus system 1 are described in the following text.

Figure 6:
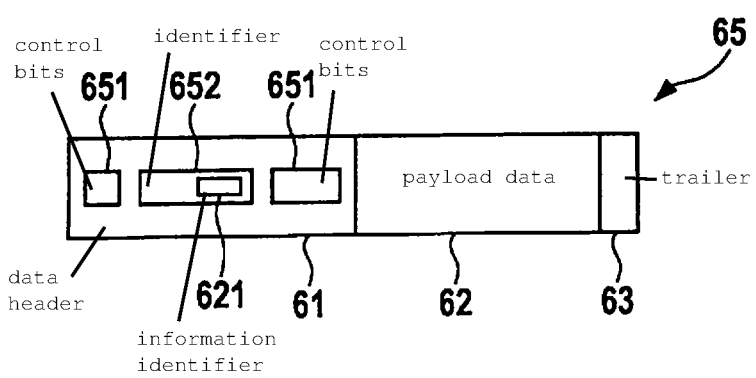

FIG. 6 shows a dynamic message 65, which is transmitted on a bus system 2 according to the second exemplary embodiment. Message 65 is structured similarly to message 60 from FIG. 3. As a result, dynamic message 65 also includes data header 61, payload data 62, and a trailer 63. In addition to control bits 651, data header 61 has an identifier 652, which makes it possible to clearly allocate message 65 to subscriber station 10, 20, 30 that has generated message 65. Trailer 63 identifies the end of dynamic message 65.

However, in contrast to message 60, identifier 652 in message 65 is subdivided into two parts. One part is used for the identification, and one part, i.e. in the form of information identifier 621, is used for transporting payload data 62.

In the development of a bus system 2 as a CAN bus, for example, the 11-bit identifier may be used for the static communication, i.e. for the transmission of messages 50. In contrast, the 29-bit identifiers are used for the dynamic communication, i.e. for the transmission of messages 65. This may be done in such a way that the last 18 bits of the 29-bit identifier are utilized as part of information identifier 621, and thus for the transport of payload data 62. The identification and allocation of the statically allocated communications resources then takes place via the first 11 bits of identifier 652.

Such a development of dynamic message 65 and the associated development of subscriber stations 10, 20, 30 and communications link 5 for generating, transmitting and receiving dynamic message 70 is advantageous in particular on bus systems 2 that has a low number of payload data.

Since identifier 652 fully or partly co-uses the static communications resources for the identification of the dynamic communications content or a portion of actual payload data 62, payload data 62 are able to be used for other purposes.

Figure 7:
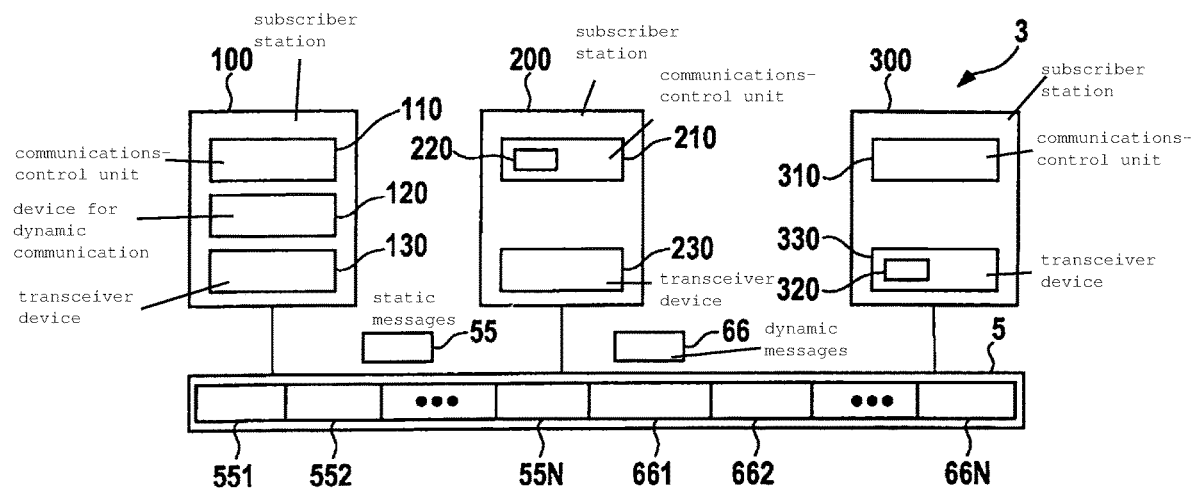
FIG. 7 shows a bus system 3 according to a third exemplary embodiment.

FIG. 7 shows a bus system 3 according to a third exemplary embodiment. Bus system 3 operates on the basis of the FlexRay standard, which is specified in the ISO standard ISO 17458-1 through 17458-5. A number of slots, or time slots 551 through 55N, is therefore provided for static messages 55.

In addition, instead of identifiers 612, 621, 652 (FIG. 3, FIG. 5), a predefined number of slots or time slots 661 through 66N is reserved for the dynamic communication in bus system 3, for dynamic messages 66. Each one of these reserved time slots 661 through 66N is then allocated to maximally one subscriber station 10, 20, 30, which may use it for transmission purposes. The content of time slots 661 through 66N is able to be received by all subscriber stations 100, 200, 300.

As illustrated in FIG. 7, subscriber station 100 has a communications-control unit 110, a device 120 for the dynamic communication, and a transceiver device 130. In contrast, subscriber station 200 has a communications-control unit 210, which includes a device 220 for the dynamic communication, and a transceiver device 230. Subscriber station 300 has a communications-control unit 310 and a transceiver device 330, which includes a device 320 for the dynamic communication. Transceiver devices 130, 230, 330 of subscriber stations 100, 200, 300 are each directly connected to communications link 5, even if this is not shown in FIG. 7.

With the exception of their development for the FlexRay standard, communications-control units 110, 120, 130 have the same function as communications-control units 11, 12, 13 in the preceding exemplary embodiments. Transceiver devices 110, 120, 130 have the same function as transceiver devices 11, 12, 13 in the preceding exemplary embodiments with the exception of their development for the FlexRay standard. In the same way, devices 120, 220, 320 for the dynamic communication have the same function as devices 12, 22, 32 for the dynamic communication in the preceding exemplary embodiments, except for their development for the FlexRay standard.

In all other respects, bus system 3 has the same structure as described in connection with the preceding exemplary embodiments.

All previously described specific embodiments of bus system 1, 2, 3, of subscriber stations 10, 20, 30, 100, 200, 300, and of the method executed on bus system 1, 2, 3 may be used individually or in all kinds of combinations. In particular, all features of the previously described exemplary embodiments and/or their modifications may be combined or omitted as desired. In addition, in particular the following modifications are possible.

The previously described bus systems 1, 2 according to the first and the second exemplary embodiment are described with the aid of a bus system that is based on the CAN or the CAN FD protocol. However, bus system 1 according to the exemplary embodiments may also involve some other type of communications network. It is advantageous, but not a mandatory requirement, that an exclusive, collision-free access of a subscriber station 10, 20, 30 to a shared channel is ensured on bus system 1, 2, at least for certain time periods.

The number and placement of subscriber stations 10 through 30 in bus systems 1, 2 of the first and second exemplary embodiments are freely selectable. In particular, it is also possible that only subscriber stations 10 or 20 or 30 are available on bus system 1 or 2. Any combinations of subscriber stations 10 through 30 in bus systems 1, 2 are possible. The same applies to subscriber stations 100 through 300 in bus system 3.

Within the meaning of the present invention, service dispatcher 121 may also carry out the allocation of messages 50, 60 to the communications resource according to some logic other than the one described in connection with FIG. 4. Important in this context is only that service dispatcher 121 transmits messages 50, 60 on provided communications resources 131, 132, 133.

Instead of at least one identifier 612, 621 of a message 50, 60, 70 transmitted via the bus, or a corresponding use of a cycle counter, as described previously with reference to the exemplary embodiments, port addresses may also be provided in another bus system in order to enable a dynamic communication on an initially static bus system.

The invention claimed is:

1. A bus system, comprising:
a plurality of subscriber stations; and
a communications link for connecting the plurality of subscriber stations to one another;
wherein:
one of the plurality of subscriber stations is a new station that was deployed into the bus system after others of the plurality of subscriber stations were deployed into, and communicated over, the communications link of the bus system;
one of the others of the plurality of subscriber stations includes a configuration indicating a type of information that another of the others of the plurality of subscriber stations transmits;
the another of the others of the plurality of subscriber stations is configured to transmit over the communications link and to the one of the others of the plurality of subscriber stations messages (a) that include a station identifier identifying the another of the others of the plurality of subscriber stations as transmitter of the message and (b) without inclusion of an information type identifier;
the new station is configured to include sensor based measurements as data in payloads of messages transmitted by the new station over the communications link and to the one of the others of the plurality of subscriber stations;
the new station includes a device for dynamic communication between the new station and the one of the others of the plurality of subscriber stations; and
the device for dynamic communication is configured to include in the messages transmitted by the new station to the one of the plurality of subscriber stations a first identifier identifying the new station as message transmitter and a second identifier, which is an information type identifier that identifies a type of the data in the payload as being measurements.

2. The bus system as recited in claim 1, wherein a transmission of the messages on the bus system is carried out in a twofold priority-oriented manner, in which both a priority of the message and a priority of an allocated communications resource are taken into account.

3. The bus system as recited in claim 1, wherein the plurality of subscriber stations each has a communications hardware and a communications software for a transmission of the messages via the communications link, the communications hardware, the communications software.

4. The bus system as recited in claim 1, wherein the deployment of the others of the subscriber stations includes delivery of a product that includes the bus system, and the bus system is at least one of a bus system of a vehicle and a serial bus system.

5. The bus system as recited in claim 1, wherein the second identifiers are included either (i) in the payloads or (ii) in a predefined number of low-priority bits of headers of the messages of the dynamic communication.

6. The bus system as recited in claim 1, wherein the bus system is a CAN or a CAN FD bus system, and the device for the dynamic communication is developed to use at least one previously reserved identifier of the CAN or the CAN FD bus system as the second identifier, each one of the previously reserved identifiers is allocated to maximally one subscriber station for the transmission of a message, and all subscriber stations are developed to receive the previously reserved identifiers.

7. The bus system as recited in claim 1, wherein the bus system is a FlexRay bus system, and the device for the dynamic communication is developed to use at least one previously reserved time window of the FlexRay bus system, and each one of the previously reserved time windows is allocated to maximally one subscriber station for the transmission of a message, and all subscriber stations are developed to receive content of the previously reserved time windows.

8. The bus system as recited in claim 1, wherein all of the plurality of subscriber stations are configured to communicate with each other using a CAN-FD protocol.

9. The bus system as recited in claim 1, wherein:
the one of the others of the plurality of subscriber stations and the another of the others of the plurality of subscriber stations were deployed into the bus system during an initial bus system deployment stage;
the new station was deployed after the initial bus system deployment stage;
for each of the plurality of subscriber stations that is deployed into the bus system after the initial bus system deployment stage, all messages from the respective subscriber station that are transmitted onto the communications link of the bus system to one or more other ones of the plurality subscriber stations each includes the first identifier and the second identifier; and
all of the plurality of subscriber stations that were deployed into the bus system during the initial bus system deployment stage are configured to transmit all of their respective messages onto the communications link of the bus system without inclusion of the information type identifier.

10. The bus system as recited in claim 1, wherein:
the one of the others of the plurality of subscriber stations and the another of the others of the plurality of subscriber stations were deployed into the bus system during an initial bus system deployment stage;
the new station was deployed after the initial bus system deployment stage;
for each of the plurality of subscriber stations that is deployed into the bus system after the initial bus system deployment stage, at least a first time that the respective subscriber station transmits a message onto the communications link of the bus system to one or more other ones of the plurality subscriber stations, the message that is transmitted includes the first identifier and the second identifier; and
all of the plurality of subscriber stations that were deployed into the bus system during the initial bus system deployment stage are configured to transmit all of their respective messages onto the communications link of the bus system without inclusion of the information type identifier.

11. The bus system as recited in claim 1, wherein:
the one of the others of the plurality of subscriber stations and the another of the others of the plurality of subscriber stations were deployed into the bus system during an initial bus system deployment stage;
the new station was deployed after the initial bus system deployment stage;
for each of the plurality of subscriber stations that is deployed into the bus system after the initial bus system deployment stage, at least a first time that the respective subscriber station transmits a message onto the communications link of the bus system to one or more other ones of the plurality subscriber stations, the message that is transmitted includes the first identifier and the second identifier.

12. The bus system as recited in claim 1, wherein:
the one of the others of the plurality of subscriber stations and the another of the others of the plurality of subscriber stations were deployed into the bus system during an initial bus system deployment stage;
the new station was deployed after the initial bus system deployment stage; and
all of the plurality of subscriber stations that were deployed into the bus system during the initial bus system deployment stage are configured to transmit all of their respective messages onto the communications link of the bus system without inclusion of the information type identifier.

13. A subscriber station for deployment into a bus system as a new station of a plurality of subscriber stations after others of the plurality of subscriber stations were deployed into, and communicated over, a communications link of the bus system, wherein (a) one of the others of the plurality of subscriber stations includes a configuration indicating a type of information that another of the others of the plurality of subscriber stations transmits and (b) the another of the others of the plurality of subscriber stations is configured to transmit over the communications link and to the one of the others of the plurality of subscriber stations messages (i) that include a station identifier identifying the another of the others of the plurality of subscriber stations as transmitter of the message and (ii) without inclusion of an information type identifier, the subscriber station for deployment as the new station comprising:
a communications-control unit for generating messages for the one of the others of the plurality of subscriber stations, with sensor based measurements as data in payloads of the messages;
a transceiver device for transmitting the generated messages to the one of the others of the plurality of subscriber stations via the communications link of the bus system; and
a device for dynamic communication between the new station and the one of the others of the plurality of subscriber stations;
wherein the device for dynamic communication is configured to include in the messages to be transmitted by the new station to the one of the others of the plurality of subscriber stations a first identifier identifying the new station as message transmitter and a second identifier, which is an information type identifier that identifies a type of the data in the payload as being measurements.

14. A method of deploying a new station to be part of a plurality of subscriber stations of a bus system after others of the plurality of subscriber stations were already deployed into, and communicated over, a communications link of the bus system, wherein (a) one of the others of the plurality of subscriber stations includes a configuration indicating a type of information that another of the others of the plurality of subscriber stations transmits and (b) the another of the others of the plurality of subscriber stations transmits over the communications link and to the one of the others of the plurality of subscriber stations messages (i) that include a station identifier identifying the another of the others of the plurality of subscriber stations as transmitter of the message and (ii) without inclusion of an information type identifier, the method comprising:
connecting the new station to the bus system with inclusion in the new station of:
a communications-control unit for generating messages for the one of the others of the plurality of subscriber stations, with sensor based measurements as data in payloads of the messages;
a transceiver device for transmitting the generated messages to the one of the others of the plurality of subscriber stations via the communications link of the bus system; and
a device for dynamic communication between the new station and the one of the others of the plurality of subscriber stations, wherein the device for dynamic communication is configured to include in the messages to be transmitted by the new station to the one of the others of the plurality of subscriber stations a first identifier identifying the new station as message transmitter and a second identifier, which is an information type identifier that identifies a type of the data in the payload as being measurements.

15. A CAN or CAN FD bus system comprising:
at least two subscriber stations; and
a communication link for connecting the at least two subscriber stations to one another, wherein:
the at least two subscriber stations and the communication link are configured for static communication of messages that are to be transmitted on the bus system, are known when the bus system is made available, and are configured according to predefined transmitters and receivers;
dynamic communication performed between the at least two subscriber stations can be performed over the communication link using at least one dynamic communication device, the dynamic communication being of dynamic messages that include dynamic payload data and that are known only after the at least two subscriber stations and the communication link have been provided;
the at least one dynamic communication device is configured to use at least one identifier of the CAN or CAN FD bus system that is pre-reserved as a communication resource for dynamic communication and that each is assigned to at most, one of the at least two subscriber station for transmitting one or more of the dynamic messages;
all of the at least two subscriber stations are configured to receive the at least one pre-reserved identifier;
the dynamic payload data are identified by information identifiers, the at least one pre-reserved identifiers identifying the communication resources independently of the identification of the dynamic payload data, which is via the information identifiers; and the statically communicated messages and the dynamic messages are transmitted in the bus system in a dual priority-oriented manner, in which both respective priorities of the respective message and communication resource priorities are taken into account.

16. The bus system as recited in claim 15, wherein the at least one dynamic communication device includes a service dispatcher that groups the statically communicated messages and the dynamic messages according to a priority of the dynamic messages to be transmitted.

17. The bus system as recited in claim 15, wherein:
the at least two subscriber stations each includes communication hardware and communication software for transmitting the messages via the communication link; and
the communication hardware, the communication software, and the communication link are used for the static communication.

18. The bus system as recited in claim 17, wherein the at least one dynamic communication device is also used for the static communication.

19. The bus system as recited in claim 15, wherein the bus system at least one of:
is produced as a stand-alone system;
is a bus system of a vehicle; and
is a serial bus.

20. The bus system as recited in claim 15, wherein the information identifiers are part of the payload data.

* * * * *